(12) United States Patent
Chen et al.

(10) Patent No.: US 7,817,066 B2
(45) Date of Patent: Oct. 19, 2010

(54) IN-VEHICLE COMPUTER SYSTEM

(75) Inventors: Kuo-Rong Chen, Panchiao (TW); Chun-Chung Lee, Taipei (TW); Ming-Wen Yang, Sinjhuang (TW)

(73) Assignee: Sin Etke Technology Co., Ltd., Taipei (TW)

(*) Notice: Subject to any disclaimer, the term of this patent is extended or adjusted under 35 U.S.C. 154(b) by 1079 days.

(21) Appl. No.: 11/515,033

(22) Filed: Sep. 5, 2006

(65) Prior Publication Data
US 2008/0010595 A1 Jan. 10, 2008

(30) Foreign Application Priority Data
Jul. 6, 2006 (TW) .............. 95124632 A

(51) Int. Cl.
*B64F 1/18* (2006.01)
(52) U.S. Cl. .............. 340/995.18; 340/955.1; 340/955.14
(58) Field of Classification Search .......... 340/988, 340/990, 995.1, 995.11, 995.12, 995.14, 340/995.15, 995.16, 995.18, 425.19; 711/162; 701/200, 211; 726/17
See application file for complete search history.

(56) References Cited

U.S. PATENT DOCUMENTS

| 6,366,986 B1* | 4/2002 | St. Pierre et al. ............ 711/162 |
| 7,130,656 B2* | 10/2006 | Okagaki et al. ............. 455/557 |
| 7,133,774 B2* | 11/2006 | Hessing et al. ............. 701/211 |
| 7,363,146 B2* | 4/2008 | Yokota ....................... 701/200 |
| 7,383,127 B2* | 6/2008 | Matsuo et al. ............. 701/211 |
| 7,392,541 B2* | 6/2008 | Largman et al. ............. 726/17 |

* cited by examiner

*Primary Examiner*—Van T. Trieu
(74) *Attorney, Agent, or Firm*—Bacon & Thomas, PLLC

(57) ABSTRACT

An in-vehicle computer system includes a host computer, a mode switch and a backup microprocessor. When the host computer functions ordinarily, the mode switch is in a regular mode as a default, and the host computer uses various graphical interfaces on a display to control the operations of electronic devices implemented in a vehicle. The electronic devices can include a digital versatile disc (DVD) player, an MP3 player and a global positioning system (GPS). When a total failure of the computer occurs, the mode switch is switched to a backup mode, and the host computer is replaced by the backup microprocessor to control a backup graphical processor to extract backup graphical interfaces from a backup storage medium for graphical processing and further presentation on the display. Thus, a driver can continuously control the corresponding electronic devices through the backup graphical interfaces on the display.

10 Claims, 3 Drawing Sheets

IN-VEHICLE COMPUTER SYSTEM

BACKGROUND OF THE INVENTION

1. Field of the Invention

The present invention relates to an in-vehicle computer system and, more particularly, to an in-vehicle computer system equipped with a backup system.

2. Description of Related Art

A conventional in-vehicle computer implemented in a vehicle can provide various travel services such as the information from an e-map or geographical information system (GIS), e-shopping, satellite navigation, on-the-spot report and MP3 playback when driving. When the ignition of the vehicle is actuated, the conventional in-vehicle computer is simultaneously booted to provide the cited travel services.

Generally, the conventional in-vehicle computer is configured as a conventional personal computer, and a complete malfunction may occur on the conventional in-vehicle computer of the vehicle while traveling. In this case, since there is no backup for the conventional in-vehicle computer, the driver cannot use the travel services unless the ignition is terminated and then restarted to thereby reset the conventional in-vehicle computer. However, if the vehicle is being driven at a high speed (for example, driving on a highway) at this moment, due to the safety consideration to the driver in driving, the ignition cannot be simply terminated and restarted to reset the conventional in-vehicle computer. Accordingly, the conventional in-vehicle computer cannot provide an easily usable feature to the driver.

Therefore, it is desirable to provide an improved in-vehicle computer system to mitigate and/or obviate the aforementioned problems.

SUMMARY OF THE INVENTION

The present invention is to provide an in-vehicle computer system, which can control various operations of plural electronic devices in a vehicle. The in-vehicle computer system includes a display, a host computer, a backup storage medium, a backup graphical processor, and a backup microprocessor. The display is electrically connected to a mode switch. The mode switch is switched between a regular mode and a backup mode. The host computer is electrically connected to the mode switch and uses a bus to connect to the electronic devices in the vehicle. The host computer includes a central processing unit (CPU) and a storage medium. The storage medium stores plural graphical interfaces corresponding to the operations of the electronic devices, respectively. The backup storage medium stores at least one backup graphical interface corresponding to at least one operation of the electronic devices. The backup graphical processor is electrically connected to the backup storage medium and the mode switch. The backup microprocessor is electrically connected to the backup graphical processor and at least one of the electronic devices.

When the host computer functions ordinarily, the mode switch is in a regular mode as a default, and accordingly the CPU extracts the graphical interfaces from the storage medium and presents them on the display. Further, the CPU controls the operations of the electronic devices through the graphical interfaces. However, when the host computer is out of order, the mode switch switches the regular mode to a backup mode, and accordingly the backup microprocessor controls the backup graphical processor to extract the at least one backup graphical interface from the backup storage medium for graphical processing and further presenting information on the display. The backup microprocessor uses the at least one backup graphical interface to control at least one operation of the electronic devices corresponding to the at least one backup graphical interface.

Therefore, the in-vehicle computer system can provide a backup mechanism to the driver such that when the vehicle is traveling and the host computer presents a malfunction, a failure, or irregular operations, the driver can use the mode switch to switch the regular mode to the backup mode in real-time, without re-actuating the ignition of the vehicle, and continuously control the corresponding electronic devices through the backup graphical interfaces on the display, which allows the driver to easily control the electronic devices in the vehicle.

The at least one backup graphical interface stored in the backup storage medium includes one or more icons to correspond to one or more operations of the electronic devices.

The mode switch can be a manual or circuit switch. The manual switch can be a switch button or dial switch on a control panel, or other equivalents. The circuit switch has an electric auto-detection.

The control panel can have other control buttons to input various control signals to thereby manipulate the electronic devices corresponding to the graphical interfaces or the backup graphical interface.

The mode switch and the backup graphical processor can be integrated into a graphical processing chip or separately formed to become two individual chips.

The electronic devices controlled by the in-vehicle computer system includes, but not limited to, a digital versatile disc (DVD) player, a MP3 player, a compact disc (CD) player, a global positioning system (GPS), a radio, a navigation system, an air conditioning (A/C) system, an in-vehicle cellphone device and a variable position electrically powered seat.

The backup microprocessor can be electrically connected to the electronic devices corresponding to the at least one backup graphical interface through the bus or other external connection.

Other objects, advantages, and novel features of the invention will become more apparent from the following detailed description when taken in conjunction with the accompanying drawings.

DETAILED DESCRIPTION OF THE PREFERRED EMBODIMENT

The invention is characterized in that an in-vehicle computer system with a backup mechanism is implemented in a vehicle.

Figure 1:
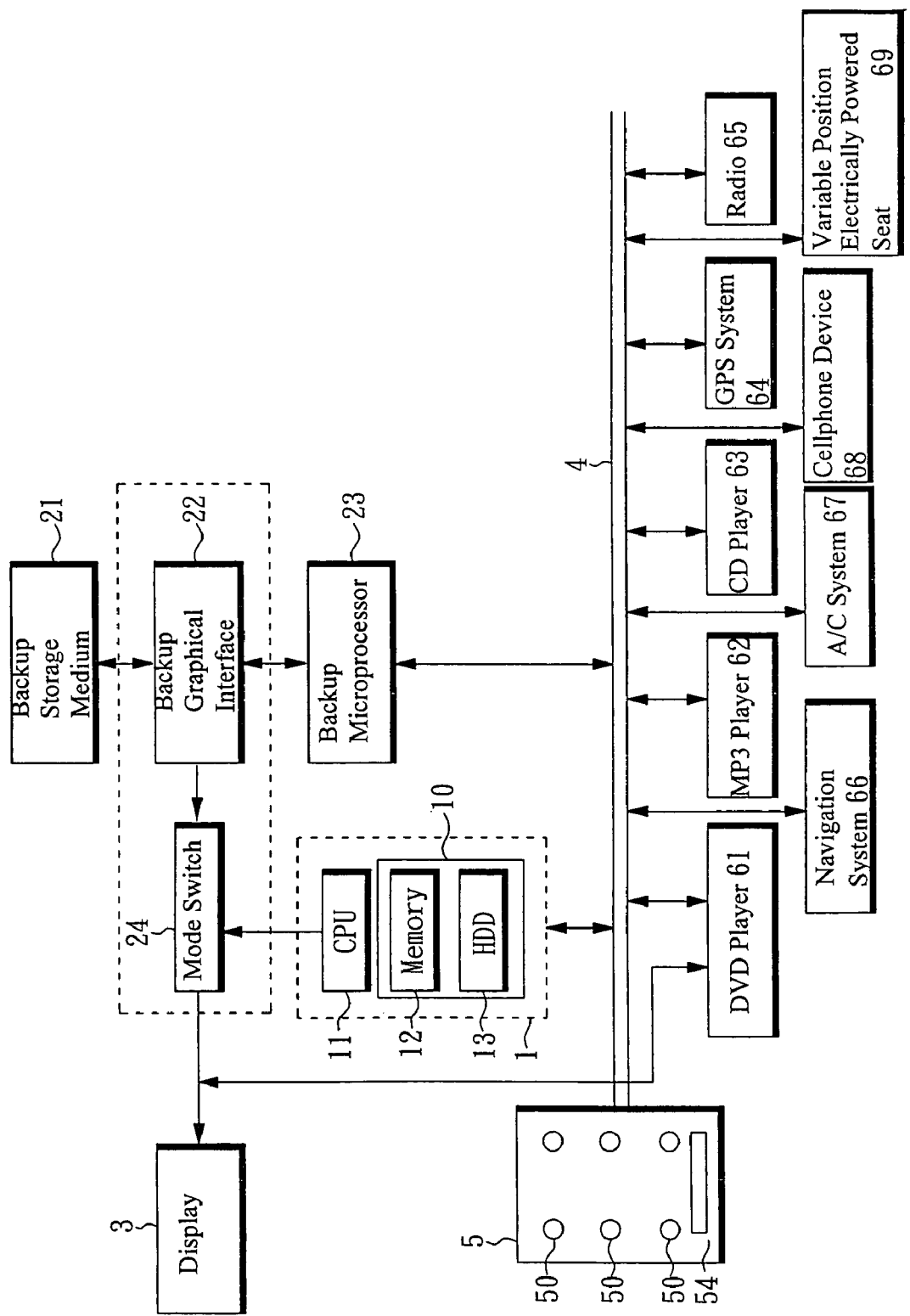
FIG. 1 is a block diagram of an in-vehicle computer system in accordance with a preferred embodiment of the invention.

With reference to FIG. 1, this embodiment implements an in-vehicle computer system in a vehicle. The in-vehicle computer system can control various operations of the electronic devices, such as a DVD player 61, an MP3 player 62, a CD player 63, a GPS 64, a radio 65, a navigation system 66, an A/C system 67, a cellphone device 68 and a variable position electrically powered seat 69 in the vehicle (hereinafter, referring to as the in-vehicle electronic devices 61-69). It is to be noted that the feature of the in-vehicle computer system is to contain a backup storage medium 21, a backup graphical processor 22, a backup microprocessor 23 and a mode switch 24. The mode switch 24 can switch between a regular mode and a backup mode.

FIG. 1 is a block diagram of an in-vehicle computer system in accordance with a preferred embodiment of the invention. As shown in FIG. 1, the in-vehicle computer system includes a display 3, a host computer (Auto PC) 1, the backup storage medium 21, the backup graphical processor 22, the backup microprocessor 23, the mode switch 24, the in-vehicle electronic devices 61-69, and a control panel 5. The host computer 1 is electrically connected to the in-vehicle electronic devices 61-69 through a bus 4. In this embodiment, the control panel 5 is implemented on the instrument panel (IP) for the driver to conveniently operate. Various buttons are implemented on control panel 5 in order to input the control signals to manipulate the corresponding in-vehicle electronic devices 61-69. In addition, the bus 4 adopts a controller area network bus (CAN BUS) to electrically connect to the host computer 1, the control panel 5, the backup microprocessor 23 and the in-vehicle electronic devices 61-69 to thereby steadily and rapidly send the control signals.

In this embodiment, the host computer 1 preferably is an embedded system with an operating system WIN-CE to reduce the cost and enhance the performance. As shown in FIG. 1, the host computer 1 includes a CPU 11 and a storage medium 10. The storage medium 10 has a memory 12, which is a built-in flash memory, and an external hard disk (HDD) 13. The graphical interfaces are stored in the hard disk 13, and each of the graphical interfaces includes one or more icons corresponding to one or more operations of the in-vehicle electronic devices 61-69.

Figure 2:
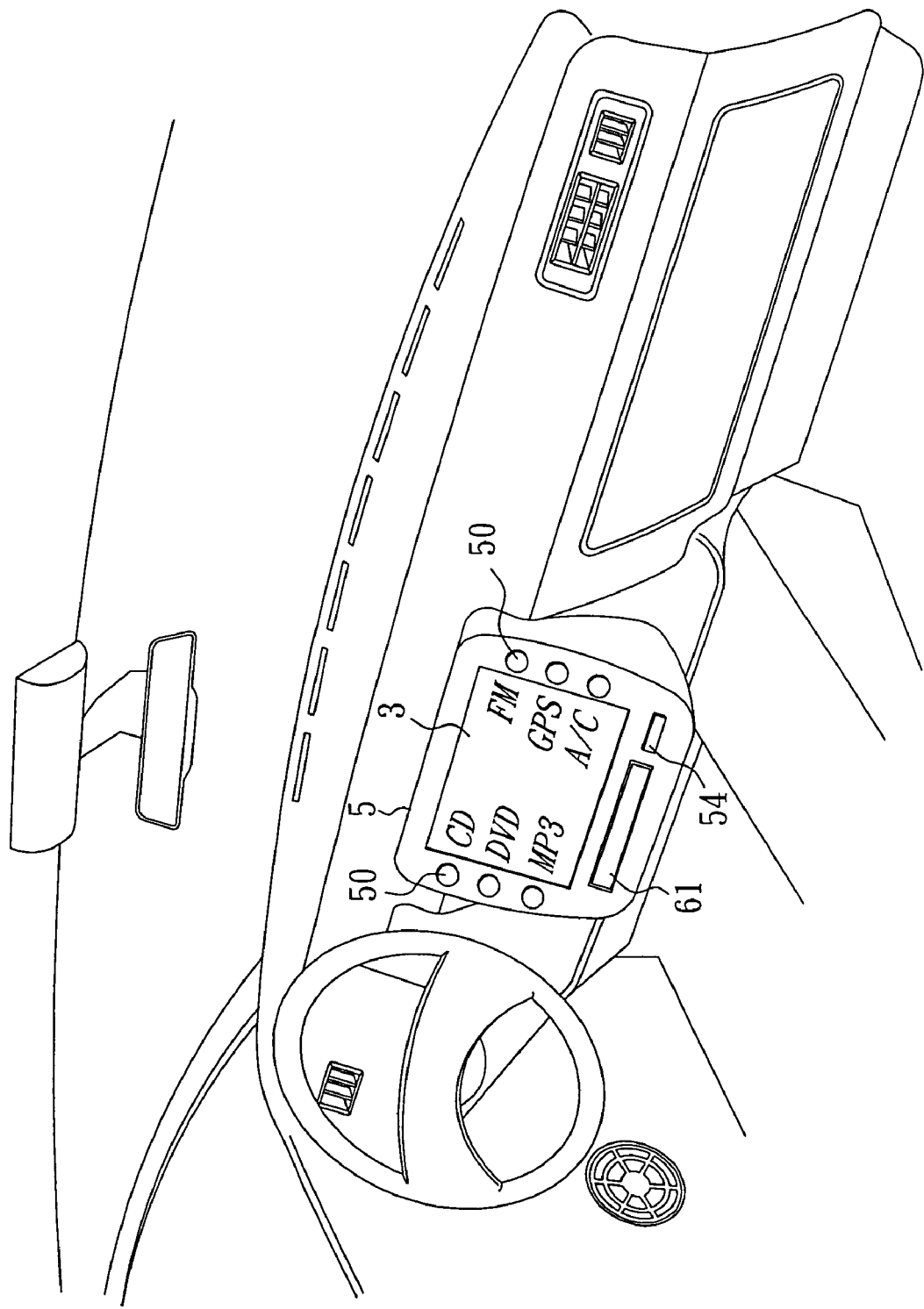
FIG. 2 is a schematic view of a regular mode operation of the in-vehicle computer system of FIG. 1 in accordance with a preferred embodiment of the invention.

When the ignition of the vehicle is actuated, the host computer 1 is also booted to work. When the host computer 1 operates ordinarily, the mode switch 24 is in a regular mode as a default. In this case, because the CPU 11 of the host computer 1 works as usual, the graphical interfaces in the hard disk 13 are extracted as usual, and their icons are displayed on the display 3, as shown in FIG. 2. Thus, the driver can check the frame shown on the display 3, and further control and operate the electronic devices 61-69 through the respective control buttons 50 on the control panel 5. For example, the DVD player 61, the MP3 player 62 or the CD player 63 is controlled to operate the play, stop, pause, fast forward and rewind actions.

However, when the host computer 1 is out of order, such as a crash or failure, it cannot extract the graphical interfaces from the hard disk 13 for further display and control. In this case, the backup microprocessor 23 is used instead.

As shown in FIG. 1, the mode switch 24 is electrically connected to the backup graphical processor 22, the display 3 and the host computer 1. The backup graphical processor 22 is electrically connected to the backup microprocessor 23, and the backup storage medium 21. In practice, the mode switch 24 and the backup graphical processor 22 are preferably integrated into a graphical processing chip. The backup microprocessor 23 is electrically connected to the in-vehicle electronic device 61-69 through the bus 4 to thereby steadily and rapidly send the control signals.

In this embodiment, the backup storage medium 21 stores at least one backup graphical interface. The backup storage medium 21 preferably adopts a flash memory. Due to the limited memory space, only a few backup graphical interfaces, which are important or essential, are stored in the flash memory. Therefore, the backup graphical interfaces stored in the backup storage medium 21 have the picture dimensions, the resolutions and the file sizes smaller or simpler than those stored in the hard disk 13 to thereby reduce the memory space. Similarly, each of the backup graphical interfaces has one or more icons corresponding to one or more operations of the electronic devices 61-69.

Accordingly, once the host computer 1 undergoes a crash and cannot use the graphical interfaces in the hard disk 13 in control, the driver can reset the host computer 1 by terminating first, and then restart the ignition of the vehicle, the invention offers the driver another option, especially when the vehicle is traveling on a highway. Namely, the driver can use a manual mode switch to switch the regular mode to the backup mode. In this embodiment, the manual mode switch 24 is a switch button 54 exposed on the control panel 5. The switch button 54 is electrically connected by a wire (not shown) to the mode switch 24 through the interior of the instrument panel, thereby providing a convenient operation to the driver.

Figure 3:
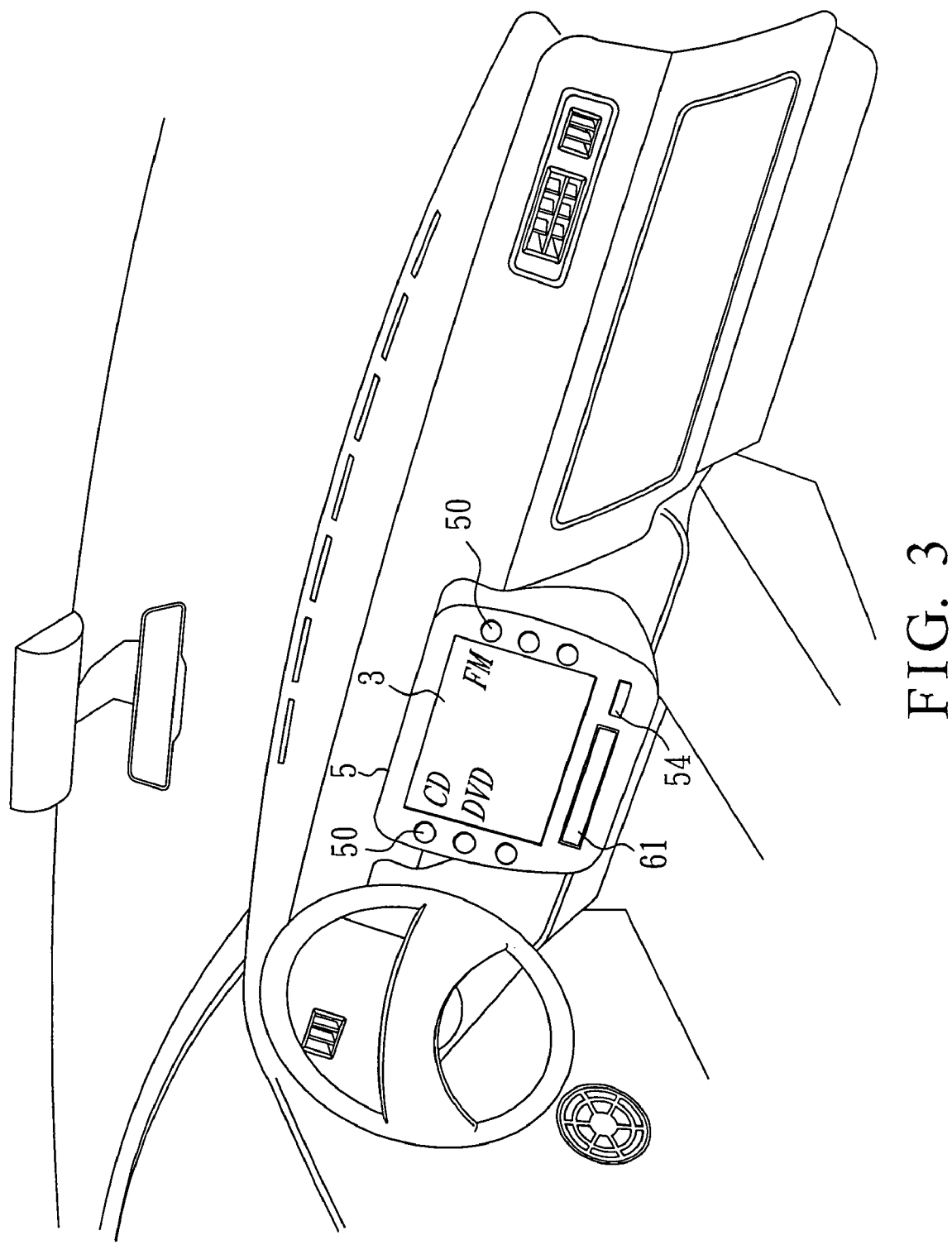
FIG. 3 is a schematic view of a backup mode operation of the in-vehicle computer system of FIG. 1 in accordance with a preferred embodiment of the invention.

The driver manually presses down the switch button 54 to make the mode switch 24 enter the backup mode and the backup microprocessor 23 start to boot. Subsequently, after the booting is complete, the backup microprocessor automatically controls the backup graphical processor 22 to extract the backup graphical interfaces from the backup storage medium 21 for graphical processing and further displaying the icons on the display 3, as shown in FIG. 3. Due to the limited memory space, the backup storage medium 21 can provide fewer backup graphical interfaces for displaying on the display 3, even only one. In this case, the driver need use only the few backup graphical interfaces displayed on the display 3 and corresponding control buttons 50 on the control panel 6 to control and operate the corresponding in-vehicle electronic devices 61, 63, 65, for example. Accordingly, significant malfunction of the computer does not result in its complete failure.

In view of the foregoing, it is known that once the in-vehicle computer system experiences significant malfunction, a failure, or abnormal operations, the mode switch 24 can be employed to execute a mode switching and enter the backup mode at any time, even when the vehicle is traveling. Accordingly, the backup microprocessor 23 can extract the stored backup graphical interfaces, and present them on the display 3 for the driver to conveniently control the electronic devices corresponding to the backup graphical interfaces. Thus, the driver can continuously have the simple controls and operations to the important or essential electronic devices in the vehicle, without having to shut down the in-vehicle computer system and then re-actuate the ignition of the vehicle.

Although the present invention has been explained in relation to its preferred embodiment, it is to be understood that many other possible modifications and variations can be made without departing from the spirit and scope of the invention as hereinafter claimed.

What is claimed is:

1. An in-vehicle computer system, which controls various operations of plural electronic devices in a vehicle, comprising:
 a display, which is electrically connected to a mode switch, the mode switch being switched between a regular mode and a backup mode;
 a host computer, which is electrically connected to the mode switch, uses a bus to connect to the electronic devices in the vehicle, and includes a central processing unit (CPU) and a storage medium, the storage medium storing plural graphical interfaces corresponding to the operations of the electronic devices, respectively;

a backup storage medium, which stores at least one backup graphical interface corresponding to at least one operation of the electronic devices;

a backup graphical processor, which is electrically connected to the backup storage medium and the mode switch; and a backup microprocessor, which is electrically connected to the backup graphical processor and at least one of the electronic devices;

wherein when the host computer functions ordinarily, the mode switch is in a regular mode as a default, the CPU extracts the graphical interfaces from the storage medium and presents the captured graphical interfaces on the display, and the CPU controls the operations of the electronic devices through the graphical interfaces; and when the host computer is out of order, the mode switch switches the regular mode to a backup mode, the backup microprocessor controls the backup graphical processor to extract the at least one backup graphical interface from the backup storage medium for graphical processing and further presentation on the display, and the backup microprocessor uses the at least one backup graphical interface to control at least one operation of the electronic devices corresponding to the at least one backup graphical interface.

2. The system as claimed in claim 1, wherein the mode switch is a manual switch.

3. The system as claimed in claim 1, wherein the mode switch and the backup graphical processor are integrated into a graphical processing chip.

4. The system as claimed in claim 1, wherein the electronic devices are one or more selected from a digital versatile disc (DVD) player, an MP3 player, a compact disc (CD) player, a global positioning system (GPS), a radio, a navigation system, an air conditioning (A/C) system, an in-vehicle cellphone device, and an electric chair device.

5. The system as claimed in claim 1, wherein the host computer is an embedded computer system.

6. The system as claimed in claim 1, wherein the host computer is booted as soon as an ignition of the vehicle is actuated, and the backup microprocessor is booted when the mode switch switches to the backup mode.

7. The system as claimed in claim 1, wherein the storage medium comprises a memory and a hard disk, and the hard disk stores the graphical interfaces.

8. The system as claimed in claim 7, wherein the memory is a flash memory.

9. The system as claimed in claim 1, wherein the backup microprocessor uses the bus to electrically connect to at least one of the electronic devices corresponding to the at least one backup graphical interface.

10. The system as claimed in claim 1, wherein the bus is a controller area network bus (CAN BUS).

* * * * *